United States Patent
Knoplioch et al.

(10) Patent No.: US 8,019,133 B2
(45) Date of Patent: Sep. 13, 2011

(54) METHOD AND SYSTEM FOR DISPLAY OF STRUCTURES OR REGIONS OF INTEREST

(75) Inventors: Jérôme Knoplioch, Neuilly sur Seine (FR); Fabrice Poupon, Villebon sur Yvette (FR)

(73) Assignee: General Electric Company, Schenectady, NY (US)

( * ) Notice: Subject to any disclaimer, the term of this patent is extended or adjusted under 35 U.S.C. 154(b) by 1340 days.

(21) Appl. No.: 11/312,121

(22) Filed: Dec. 20, 2005

(65) Prior Publication Data

US 2007/0019850 A1 Jan. 25, 2007

(30) Foreign Application Priority Data

Dec. 27, 2004 (FR) ..................................... 04 13941

(51) Int. Cl.
*G06K 9/00* (2006.01)
*G06T 15/00* (2011.01)

(52) U.S. Cl. ......................... 382/128; 382/154; 345/419

(58) Field of Classification Search .................. 382/154, 382/284, 173–180, 256–258, 128–132; 345/419–427; 348/42–60; 356/12–24
See application file for complete search history.

(56) References Cited

U.S. PATENT DOCUMENTS

| | | | | |
|---|---|---|---|---|
| 5,056,066 A * | 10/1991 | Howard | ........................... | 367/72 |
| 5,903,664 A * | 5/1999 | Hartley et al. | ................ | 382/154 |
| 6,366,800 B1 * | 4/2002 | Vining et al. | ................ | 600/425 |
| 6,577,752 B2 * | 6/2003 | Armato et al. | ................ | 382/131 |
| 6,606,091 B2 * | 8/2003 | Liang et al. | .................... | 345/424 |
| 6,690,816 B2 * | 2/2004 | Aylward et al. | ............... | 382/128 |
| 6,694,163 B1 * | 2/2004 | Vining | .......................... | 600/407 |
| 6,704,439 B1 * | 3/2004 | Lee et al. | ....................... | 382/131 |
| 6,754,376 B1 * | 6/2004 | Turek et al. | .................... | 382/131 |
| 6,813,374 B1 * | 11/2004 | Karimi et al. | ................. | 382/131 |
| 6,995,763 B2 * | 2/2006 | Gatti et al. | ..................... | 345/424 |
| 7,072,501 B2 * | 7/2006 | Wood et al. | ................... | 382/132 |
| 7,123,766 B2 * | 10/2006 | Mao et al. | ...................... | 382/154 |
| 7,272,250 B2 * | 9/2007 | Schneider et al. | ............ | 382/128 |
| 7,336,809 B2 * | 2/2008 | Zeng et al. | .................... | 382/128 |
| 7,356,173 B2 * | 4/2008 | Wiemker et al. | ............... | 382/128 |
| 7,397,937 B2 * | 7/2008 | Schneider et al. | ............ | 382/130 |
| 7,424,149 B2 * | 9/2008 | Gerard et al. | ................. | 382/173 |
| 2003/0152262 A1 | 8/2003 | Mao et al. | | |

OTHER PUBLICATIONS

Philip, K.P.; Dove, E.L.; McPherson, D.D.; Gotteiner, N.L.; Vonesh, M.J.; Stanford, W.; Reed, J.E.; Rumberger, J.A.; Chandran, K.B., "Automatic detection of myocardial contours in cine-computed tomographic images," Medical Imaging, IEEE Transactions on , vol. 13, No. 2, pp. 241-253, Jun. 1994.*

(Continued)

*Primary Examiner* — Gregory M Desire
*Assistant Examiner* — Andrae S Allison
(74) *Attorney, Agent, or Firm* — Cantor Colburn LLP (57) ABSTRACT

A system and a method for extracting regions of interest from a medical image in order to obtain an image useable by a user. The system includes a user interface comprising virtual buttons that the user can select using an input, the buttons enabling the user to control a selected region extraction method using a region growth method to extract a region The region extraction method depend on which virtual buttons are selected by the user. The user interface also includes a window in which the result of extraction of the region of interest can be displayed, as the region is being grown.

20 Claims, 9 Drawing Sheets

OTHER PUBLICATIONS

Bear, Efficient Implementation of Thelocally Constrained Watershed Transform and Seeded Region Growing, Mathematical Morphology: 40 Years on Proceedings of the 7th International Symposium on Mathematical Morphology, Apr. 18-20, 2005, 217-227.*

Mazonakis et al,Image segmentation in treatment planning for prostate cancer using the region growing technique, The British Journal of Radiology, 74 (2001), 243-248 E 2001 The British Institute of Radiology.*

Meinzer et al, "Medical imaging: examples of clinical applications", ISPRS Journal of Photogrammetry & Remote Sensing 56 (2002) 311-325.*

"Analyze 5 Users Manual, Chap. 11: Segmentation"; pp. 110-131; Aug. 2004; url:ftp://65.64.106.182/5.0Documents/5manual.pdf>; XP002335333.

Adams et al;, "Seeded region growing", IEEE Trans. on Pattern Analysis and Machine Intelligence, vol. 16, No. 6, Jun. 1994, pp. 641-647.

Alyassin et al., "semi-automatic bone removal technique from CT angiography data", Proc. SPIE Med. Imaging 2001, vol. 4322, pp. 1273-1283.

Jahne et al., "Digital Image Processing, Chap. 18: morphology", 2002, pp. 481-494.

Hiroyuki Sekiguchi et al., "Interactive 3-Dimensional Segmentation Method Based on Region Growing Method", Systems & Computers in, 1994 Japan, Scripta Technica Journals, vol. 25, No. 1. Jan. 1994, pp. 88-97.

* cited by examiner

FIG.9

METHOD AND SYSTEM FOR DISPLAY OF STRUCTURES OR REGIONS OF INTEREST

CROSS-REFERENCE TO RELATED APPLICATIONS

This application claims the benefit of a priority under 35 USC 119 (a)-(d) to French Patent Application No. 04 13941 filed Dec. 27, 2004, the entire contents of which are hereby incorporated by reference.

BACKGROUND OF THE INVENTION

An embodiment of the present invention is directed to a method and system for display of structures or regions of interest. In particular, an embodiment of the present invention is related in general to images that may be associated with heart examinations by ultrasounds, magnetic resonance, tomography by single photon emission, tomodensitometry, and by positron emission tomography. More particularly, an embodiment of the present invention applies to methods and systems for automating the display of structures or regions of interest.

Editing a 3D image to create segmentation is often the most time consuming part of generating a useable 3D image. The segmentation of an image comprises extracting regions of interest. The same needs for segmentation are also applicable to quantification software packages (such as programs that isolate an object such as a tumor to measure its size) and to therapy planning software (for example software defining targets to be treated or defining structures to be avoided).

There are a wide variety of tools available for making segmentation. These tools are: automated editing tools such as thresholding tools, connectivity tools, or mathematical morphology tools; manual editing tools or "sculpting" tools, such as an "electronic scalpel" to cut out connections or to remove regions, a "paintbrush" to choose regions, and specialized tools for specific organs or anatomic structures (heart, vessels, lungs, etc.).

These tools have the following disadvantages: automated editing tools require a significant amount of learning about how to use them by the user; automated editing tools are not efficient in all situations; manual editing tools are difficult to use, and editing a 3D volume takes a long time if good results are to be obtained; and the quality of results obtained with manual editing tools depends on the user. These tools are becoming more and more open to criticism as the size of data sets supplied by the acquisition devices increases. The increase in the size of data sets increases the time necessary to extract a region of interest.

BRIEF DESCRIPTION OF THE INVENTION

An embodiment of the invention is directed to a method and system for displaying structures or regions of interest that provides a means for overcoming at least one of the disadvantages of the known described method and systems.

An embodiment of the invention is a system for processing an image comprising means for processing, means for input and means for display. The system also comprises a graphic user interface displayable on the means for display, the interface comprising: virtual buttons selectable by a user using the means for input, virtual buttons enabling the user to control the means for processing for extracting a structure of region of interest, by growth of structure or region starting from at least one marker point belonging to the structure or region, a window in which extraction of the structure or region of interest is displayable as the structure or region of interest grows.

Thus, the system is easy to use. It is very intuitive to use the virtual buttons in the user interface, the user does not need to input numeric parameters such as threshold values, etc. Furthermore, the user can visually check extraction of the region as it grows in this window. Thus, the user can stop growth of the region of interest during extraction as soon as he considers that the size of the grown region is sufficient. The user stops growth of the region of interest by pressing a computer mouse button (or any other selection means such as a key) or using any other means for input such as a keyboard.

An embodiment of the present invention is a method for treatment of an image comprising: displaying virtual buttons enabling the control of a region extraction; when one of the virtual buttons is selected by the user, extracting the region of interest using a region extraction method by growth of the region starting from at least one marker point belonging to this region; displaying a window in which extraction of the region of interest is displayable as the region grows. A computer program including appropriate coding means enables implementation of the method.

BRIEF DESCRIPTION OF THE DRAWING

Other characteristics of an embodiment of the method and system will become clearer from the following description which is given purely for illustrative purposes and is in no way limitative, and should be read with reference to the appended figures, wherein.

DETAILED DESCRIPTION OF THE INVENTION

One purpose of the method and system for displaying regions of interest is to provide for the reduction of the time necessary for a user to obtain useable images and to reduce dependence of the system with regard to the user.

Figure 1:
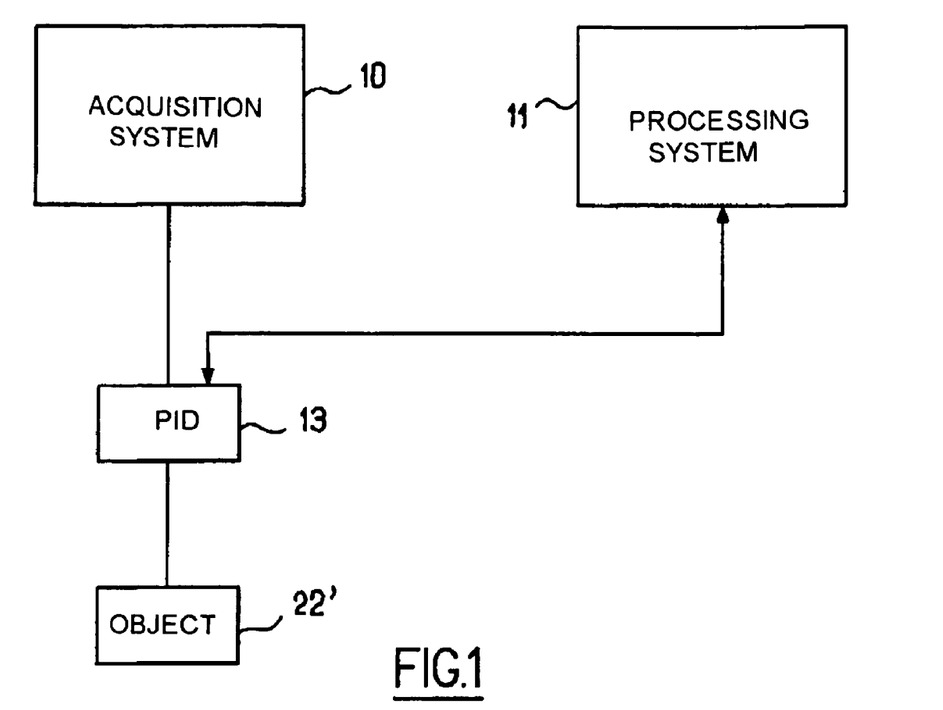
FIG. 1 shows an embodiment of an image acquisition and processing system.

FIG. 1 illustrates a principle diagram for an arrangement that can be used for acquisition of an image and processing of the acquired image in order to extract regions of interest. The arrangement comprises an image acquisition system 10, an image processing system 11, and a physiological information device 13 (PID). The image acquisition system 10 may for example be an ultrasound image acquisition system, a magnetic resonance image (MRI) acquisition system, a single photon emission computed tomography (SPECT) image acquisition system, a tomodensitometry (TDM) image acquisition system, or a positron emission tomography (PET) image acquisition system.

The image processing system 11 may be integrated into the image acquisition system 10 or it may be separated from the image acquisition system 10. This processing system includes a user interface and means for processing (for example a computer). Furthermore when the image processing system 11 is separated from the image acquisition system 10, the processing system 10 is coupled to the image acquisition system 10 through means for communication.

The PID 13 may be separated from the image acquisition system 10, or it may be integrated into the image acquisition system 10. The PID 13 may for example be an electrocardiograph that produces an electrocardiogram (ECG). The PID 13 is coupled to the processing system 11.

The operating principle of the arrangement of FIG. 1 is as follows. The image acquisition system 10 scans an object 22' and produces original projection data. The object 22' may for example be a heart, a liver or a lung. The PID 13 produces physiological cycle signals such as EKG signals or respiratory signals including a plurality of phases such as cardiac phases or respiratory cycle phases. This data are sent to the processing system 11 that processes them using means for processing for implementing a region extraction method for extracting regions of interest in order to obtain useable images, in other words images that can be used (for example by a medical practitioner) to produce a diagnostic.

Figure 2:
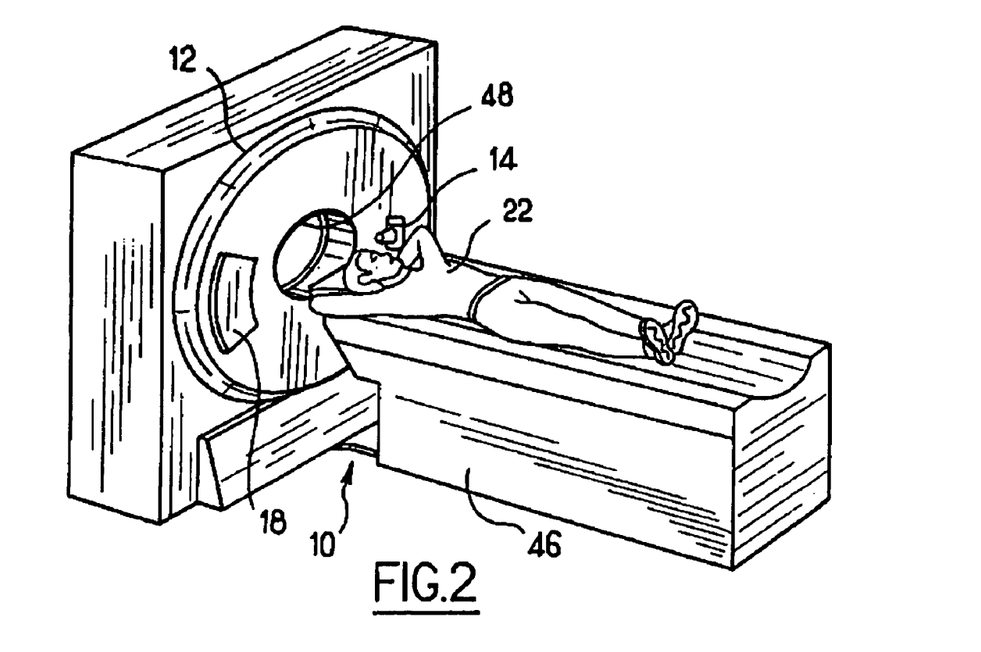
FIG. 2 shows a perspective view of an image tomodensitometric acquisition system.
Figure 3:
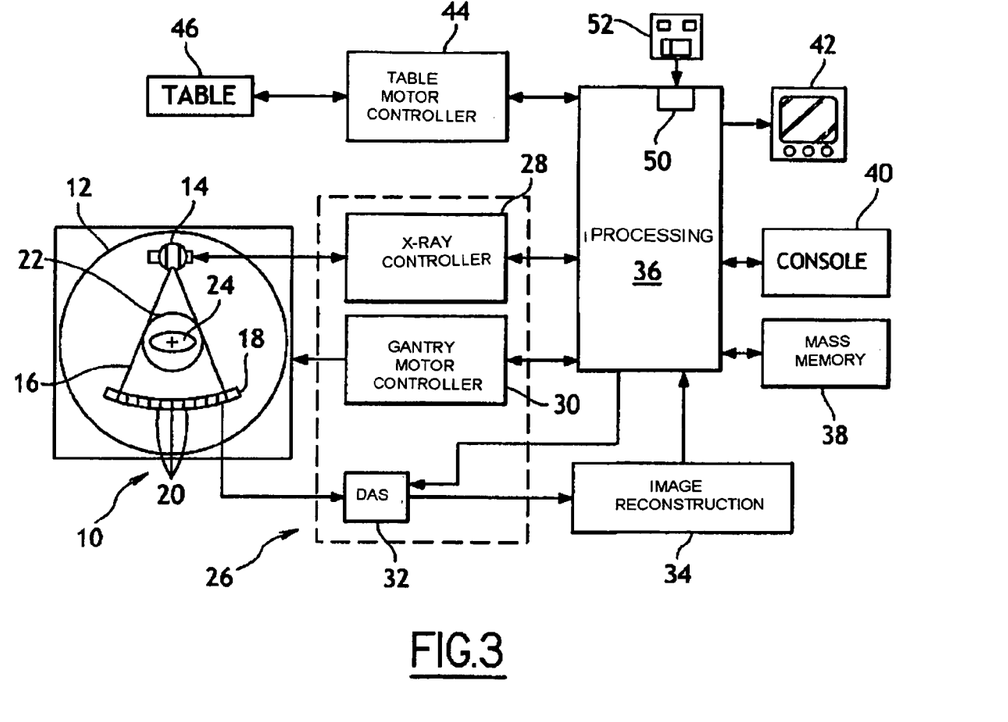
FIG. 3 shows a principle diagram of an image acquisition and processing system using the tomodensitometry acquisition system in FIG. 2.

FIGS. 2 and 3 illustrate an embodiment of the arrangement in FIG. 1 in which the image acquisition system 10 is a TDM image acquisition system. The system 10 comprises a gantry 12 and a control mechanism 26. The gantry 12 is a "third generation" TDM scanning module. The gantry 12 includes a source of radiation, such as an X-ray source 14 and a detector of the radiation, such as row 18 of radiation detectors located on the side opposite the X-ray source 14. With this type of third generation scanner, a single X-ray emission covers the width of an object such as a patient 22 (50 centimeters for an abdomen), over a thickness of 1 to 10 millimeters. The X-ray source 14 projects an X-ray beam 16 to the row 18 of detectors. The row 18 of detectors comprises detector elements 20 that detect the set of projected X rays that pass through the object 22. The row 18 of detectors may be made in a single layer configuration (strip of detectors) or a multilayer configuration (matrix of detectors). Each detector element 20 produces an electrical signal that represents the intensity of an X-ray beam overlapping this detector element and consequently attenuation of the beam while it passes through the object 22 at a corresponding angle.

During scanning to acquire X-ray projection data, the gantry 12 and the components mounted on the gantry 12 rotate about a rotation center 24. During this circular movement, 180 to 360 emissions are made and detected in 2 to 7 seconds. The rotation of the gantry 12 and operation of the X-ray source 14 are adjusted by the control mechanism 26 of the TDM image acquisition system 10. The control mechanism 26 includes an X-ray controller 28, a gantry motor controller 30, and a data acquisition system (DAS) 32. The X-ray controller 28 provides the power and the synchronization signals to the X-ray source 14. The gantry motor controller 30 controls the rotation speed and position of the gantry 12. The DAS 32 samples analog data from the detector elements 20 and converts the data into digital signals for subsequent processing.

A means for image reconstruction 34 receives sampled and digitized X-ray data from the DAS 32 and executes reconstruction of the image at high speed. Depending on the configuration of the row 18 of detectors (single layer or multilayer), the reconstructed image output from the means for image reconstruction will represent a variable thickness slice (1 to 10 mm) of the object 22.

The reconstructed image is applied as input to means for processing 36 that stores the image in a mass memory device 38. The means for processing 36 may for example be a computer, processors, microcontrollers, microcomputers, programmable logic controllers, application specific integrated circuits or other programmable circuits, or other devices that include a computer such as a workstation. The means for processing 36 also receive scanning commands and parameters from a user through a console 40 that includes means for input such as a keyboard and/or a mouse. The means for processing 36 may be integrated into the console 40 or they may be separate from the console 40. A means for display 42 associated with the means for processing 36 enable the user to observe the reconstructed image and other data.

Commands and parameters supplied by the user are used by the means for processing 36 to supply control signals and information to the DAS 32, to the X-ray controller 28 and to the gantry motor controller 30. The means for processing 36 also activate a table motor controller 44 that controls a motorized table 46 to place the object 22 in the gantry 12. In particular, the table 46 moves the object 22 through the opening 48 in the gantry 12.

The operating principle of the arrangement illustrated in FIGS. 2 and 3 is as follows. To acquire part of the body of the object 22, for example the entire torso, the object 22 is asked to lie or placed on the motorized table 46. The user then uses the console 40 to place the object 22 in the gantry 12, by setting parameters of the means for processing 46 so that they actuate the table motor controller 44. The motorized table 46 moves until the object 22 is in the correct position with respect to the gantry 12 to enable acquisition of for example the torso of the patient 22. When the object 22 is in position, acquisition can be started. The X-ray source 14 projects a beam—50 centimeters wide and 10 millimeters thick—towards the row 18 of detectors. The row 18 of detectors emits electrical signals that are sent to the means for image reconstruction 34. The means for image reconstruction 34 uses these signals to reconstruct the image representing the slice of the part of the body of the object 22 through which the X-ray beam has passed. This reconstructed image is stored by means for processing 36 in the mass memory 38. The table 46 is then moved by a few millimeters to acquire a new image representing a second slice of for example the torso of the patient 22. The second reconstructed image is also stored in memory 38. Once the entire torso of the patient 22 has been acquired, the sequence of reconstructed images stored in mass memory 38 can be displayed on means for display means 42, and the reconstructed images can be processed using means for processing 36 capable of implementing the region extraction method. Thus, movement of the object 22 through the opening 48 enables acquisition of a sequence of reconstructed images each representing a slice of the acquired part of the body of the object 22. The processing system then processes all these acquired images.

In one embodiment, the means for processing 36 comprises a read device (not shown), for example a diskette drive or a CD-ROM player, to read instructions for performing the region extraction method described below, from an instruction medium (not shown) such as a diskette or a CD-ROM.

In another embodiment, the means for processing 36 execute instructions for performing the region extraction method described below stored in micro-software (not shown).

The means for processing 36 are programmed to execute the region extraction method described below, but other programmable circuits could be programmed similarly. For example, in one embodiment, the DAS 32 executes the region extraction method.

Figure 4:
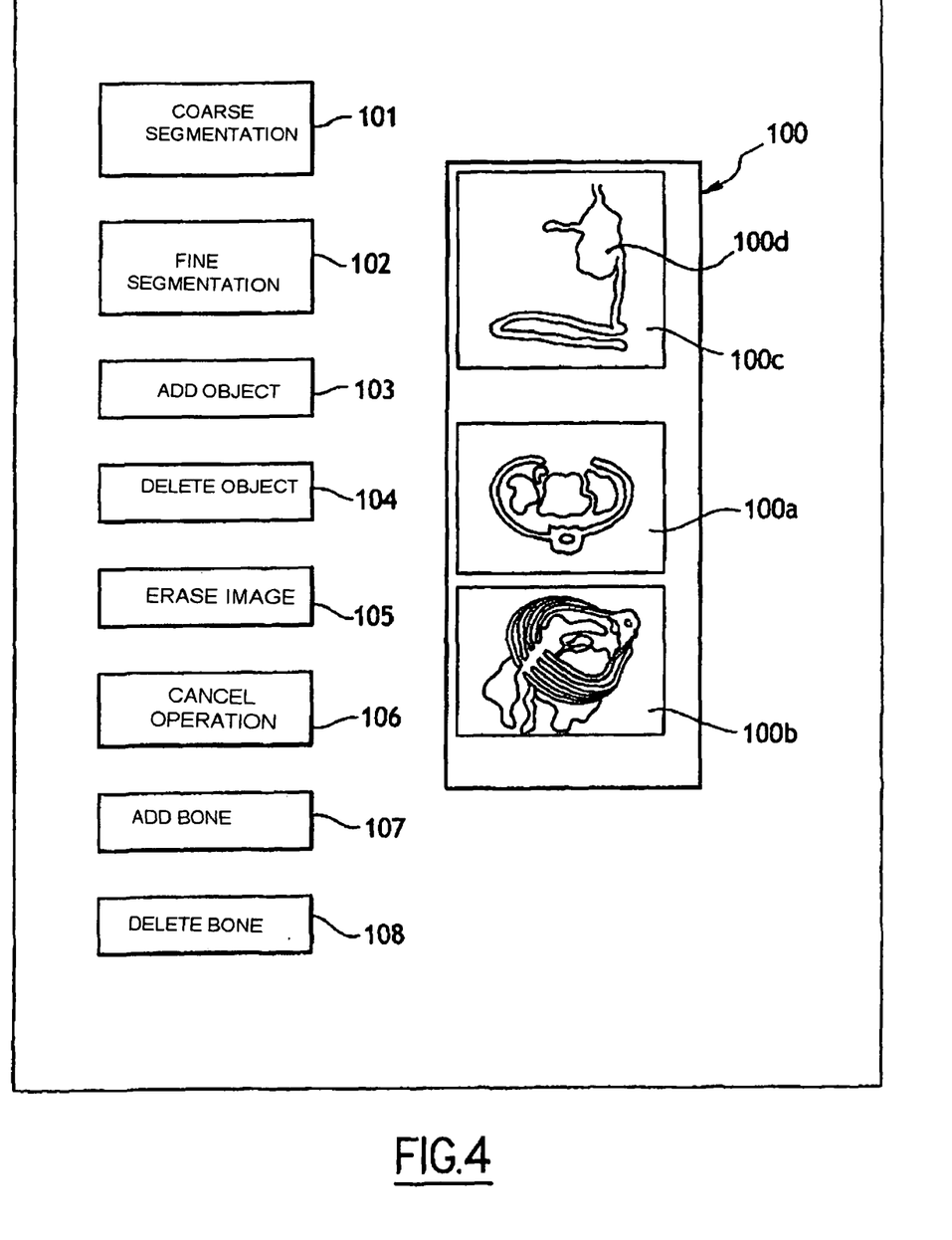
FIG. 4 shows an illustration of the user interface of the processing system.

FIG. 4 illustrates the user interface 99 of the processing system. In particular, the user can use the user interface 99 firstly to display reconstructed images output from the means for image reconstruction, and secondly to define parameters useful for the means for processing to extract regions of interest from the reconstructed images in order to generate images that can be used by the user. The user interface 99 includes a window 100 and virtual buttons 101 to 108. The user can use the window 100 to display reconstructed images and destination images in which the results of operations carried out by the user on the reconstructed images are stored. Each reconstructed image is associated with a corresponding destination image.

The reconstructed images can be displayed separately in the window 100, each image 100a then representing a thin slice of the acquired part of the object's body (for example a slice of the torso). Reconstructed images can also be stacked in order to obtain an image 100b representing a 3D volume corresponding to the acquired parts of the object's body (for example the torso).

In the following description, the plurality of reconstructed images will be qualified as the medical image, this medical image possibly being displayed in the form of separated reconstructed images or stacked images. Obviously, the medical image comprises at least one reconstructed image.

The destination images may be displayed in the window 100 separately, each image representing a slice of the extracted region of interest. The reconstructed images can also be stacked so as to obtain an image 100c representing a 3D volume corresponding to the extracted region of interest 100d. In the following, the set of destination images will be qualified as the output image, and this output image can be displayed in the window 100 in the form of separate or stacked destination images. Obviously, the output image comprises at least one destination image.

The display in the window 100 is interactive. The term "interactive" means that the user can adjust the view point of the images (for example, the medical image may be rotated or the output image may be rotated by 180°), and the results output from the means for processing capable of implementing the region extraction method are displayed very quickly once they have been calculated. Thus, the user can display the extracted region in the window 100 as it grows (real time display). The user can also stop the region extraction method at any moment that he considers appropriate, for example by actuating a means for actuating (such as a button) on the means for input or by selecting a virtual button in the user interface. Consequently, the user can control growth of the region of interest and can stop this growth whenever he thinks this growth is sufficient. Further the interactive window 100 provides the user with better control over his work than is possible with existing processing systems. For example, in existing processing systems, the result of extraction of a region cannot be displayed until the end of the region extraction method. Thus, with an existing processing system, the user cannot interrupt growth when he thinks it is sufficient.

The virtual buttons of the user interface allows the user to control the means for processing for implementing the region extraction method. These virtual buttons may include a text and/or an icon representing the processing that it controls.

The region extraction method uses a region growth method to extract the region of interest. This region growth method is chosen by the region extraction method among a plurality of region growth methods, the different region growth methods being adapted for extraction of different organic structures (bones, soft tissue, blood vessel). The choice of the region growth method by the region extraction method depends on the virtual buttons selected by the user. Thus, the behavior of the region extraction method and its parameters are adjusted as a function of which virtual buttons are selected by the user.

The virtual button 101 and the virtual button 102 allow the user to choose between respectively coarse segmentation and fine segmentation. If the user selects the virtual button 102, the extracted regions of interest are more homogeneous than they are for coarse segmentation.

In order to perform segmentation of the image, at least one 3D point has to be defined with (X, Y, Z) coordinates belonging to the region of interest that the user would like to extract. In the following, this point is called the marker point. The user selects this marker point using means for input such as a computer mouse or a keyboard. The user selects the marker by clicking on a point in the image or the output image displayed in the window 100. Note that the user can also choose to select several marker points by clicking on several points in the region or to select several points in the neighborhood of the marker point using the mouse.

The virtual button 103 and the virtual button 104 enable the user to control to the means for processing to respectively add a region of interest or to delete a region of interest in the output image. The virtual button 105 allows the user to control to the means for processing to delete or erase the output image if he is not satisfied with it, and if he would like to start processing of the image again. The virtual button 106 enables the user to cancel the last operation(s) that he performed. For example, if the user accidentally deleted a region of interest in the output image, all he needs to do is to click on the button 106 to cancel the operation and to return to the previous output image. The virtual button 107 and the virtual button 108 allow the user to respectively add or delete a region of interest when the region of interest that he wants to extract is a bone structure. In the case of bone structures, the region extraction method used in the means for processing chooses a region growth method specifically adapted to extraction of bone structure regions.

An example of use of the user interface 99 in the case of a tomodensitometry acquisition system 10 is given below. Once the data have been acquired by the acquisition system 10, they are displayed in a window 100 in the form of an image. If the user wants to add a region that is not very homogeneous to the output image, he selects the virtual button 101 (for example by clicking on it). The user then clicks on a (marker) point of the region that he wants to add to the output image, and selects the virtual button 103. The means for processing 36 of the processing system then extract the region to which the marker point belongs using the region extraction method. The user controls growth of the region on the display means that enable the region to be displayed in the window 100 as it grows. The extracted region (that is 3-dimensional) is added into the output image.

If the user would like to rework the extracted region of interest, for example by deleting a region in the region of interest, he selects the virtual button 102. The user clicks on a point in the region to be deleted in the image or in the output image and selects the virtual button 104. The means for processing 36 extract the region to which the marker point belongs using the region extraction method. The extracted region is deleted from the output image.

If the user wants to add a region corresponding to a bone structure, he clicks on a point in the medical image in the region corresponding to the structure that he wants to add. This point forms the marker point. The user selects the virtual button 107 to add regions corresponding to bone structures. The processing system extracts the region to which the marker point belongs using the region extraction method, and adds it to the output image.

All operations done on the image, using the user interface, allow the user to obtain a usable output image, in other words, an image usable for producing a diagnostic.

The region extraction method that the means for processing 36 can implement will now be described with reference to FIGS. 5 to 10.

Figure 5:
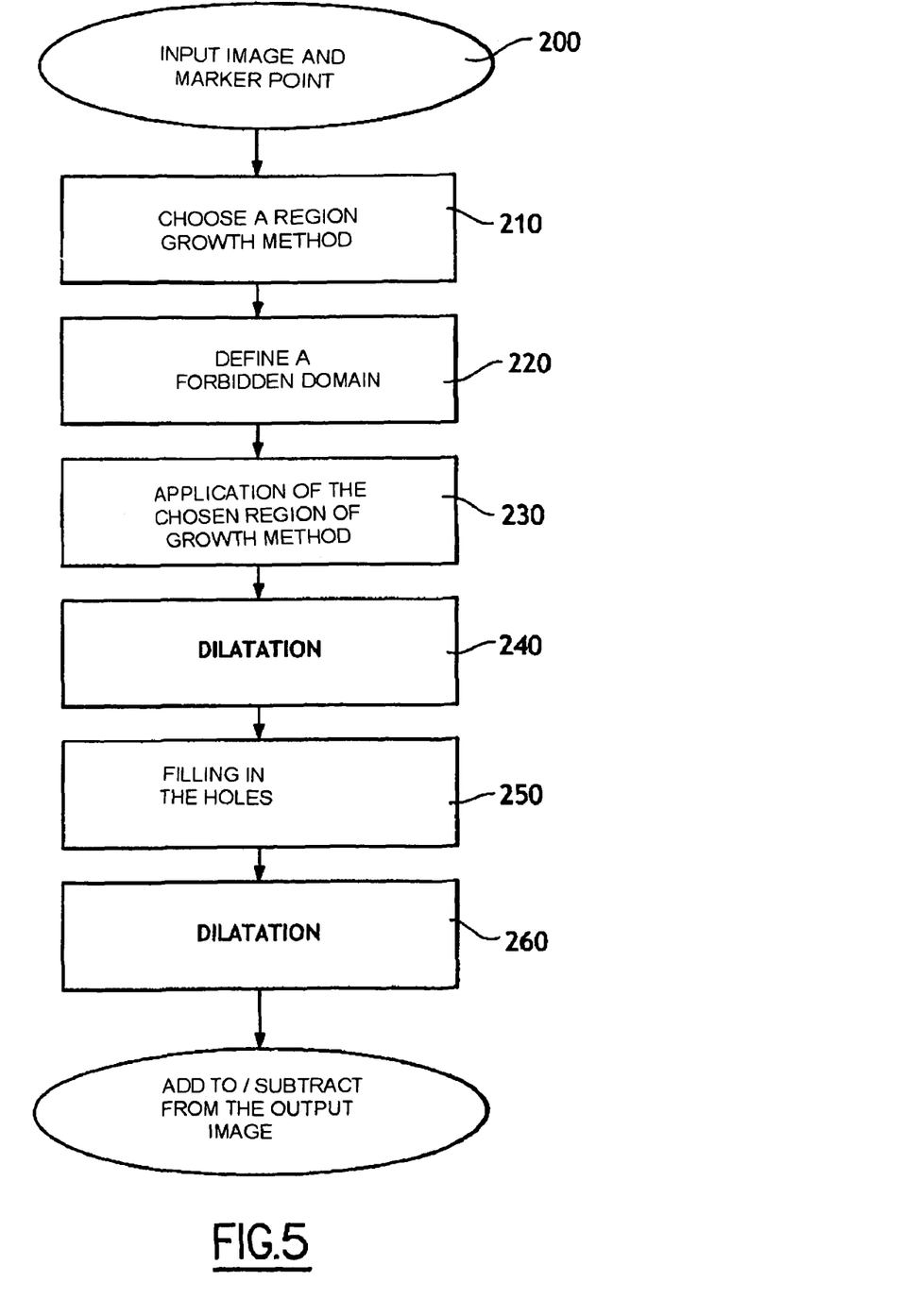
FIG. 5 shows a flowchart of the region extraction method.

FIG. 5 illustrates the region extraction method. Step 200 of the region extraction method comprises receiving the image comprising the plurality of reconstructed images that were stored in mass memory 38 by the means for processing 36, and the marker point selected by the user using the user interface 99 and the input means. Step 210 of the region extraction method comprises choosing a region growth method among three region growth methods A, B and C. The region growth method can be chosen depending on the acquisition system 10 used to acquire the input data.

In the case of an acquisition system 10 other than a tomodensitometry (TDM) acquisition system, the second region growth method B is chosen. In the case of a TDM acquisition system, if the user selects either the virtual button 107 or the virtual button 108, he can add or delete a region of interest corresponding to a bone structure, then the third region growth method C is chosen. If the user selects either the button 107 or the button 108, then the region growth method is chosen as a function of an analysis depending on the value of the voxel corresponding to the marker point. The base of this voxel (volume cell element) is the marker point and its height is the thickness of one of the slices represented in the reconstructed images. There is one voxel, which is the smallest three-dimensional element of the image, corresponding to each point in the medical image. In the following, no distinction will be made between the terms point and voxel.

The region growth method to be used is chosen as follows. If the value of the marker point is less than −800 Hounsfield units (which is the measurement unit for the relative density of the point), then this point forms part of an airway. The region growth method A is chosen and only points with a value of less than −800 Hounsfield units are accepted in the region. If the value of the marker point is between −800 and 120 Hounsfield units, then this point forms part of a soft tissue. The region growth method A is chosen, and only points with a value between −800 and 120 Hounsfield units are accepted in the region. If the value of the marker point is between 120 and 800 Hounsfield units, then this point forms part of a blood vessel or a bone. The region growth method B is chosen, and only points with a value of more than −15 Hounsfield units are accepted in the region. If the value of the marker point is more than 800 Hounsfield units, then this point forms part of a bone. The region growth method A is chosen, and only points with a value of more than 120 Hounsfield units are accepted in the region.

Step 220 of the region extraction method comprises defining a forbidden domain in order to restrict the search space for the region of interest. The forbidden domain corresponds to a set of points in the image that cannot be included in the region to be extracted. The forbidden domain is defined by thresholding the input image in order to only search for the region of interest among a range of values of points. The method used to define the forbidden domain depends on the selected region growth method (A, B or C).

Step 230 of the region extraction method comprises applying the region growth method selected in step 210. Remember that the general principle of a region growth method comprises iteratively grouping sets of image points depending on their homogeneity, this grouping continuing until all that is left are homogeneous regions of points, with sufficiently large differences between them.

Step 240 of the region extraction method comprises expanding the resulting region obtained at the output from step 230. Remember that dilatation is a mathematical morphology operation defined by the following property: "A' is said to be dilated from A by ϵ if A is included in A' and if the distance from "a" to "a'" is greater than or equal to ϵ, for all pairs of points (a', a) such that "a" belongs to A and "a'" belongs to A'".

Step 250 of the region extraction method comprises filling the holes of the grown region of interest. During growth of the region, some points may be considered as not forming part of the grown region, although they actually do form part of it. In this case, the grown region includes holes. This is why holes are filled in. This step may be done by a closing that is another mathematical morphology operation. A closing operation comprises a dilatation followed by an erosion. Remember that erosion is defined by the following property: "A' is said to be eroded from A by ϵ if A' is included in A and if the distance from "a'" to "a" is greater than or equal to ϵ, for all pairs of points (a', a) such that "a'" belongs to A' and "a" belongs to A".

The step 260 of the region extraction method comprises dilating the region obtained at the output from step 250. The region obtained at the output from step 260 is then added to or subtracted from the output image, depending on whether the user selected the region of interest add virtual button 103 or the region of interest delete virtual button 104.

Figure 6:
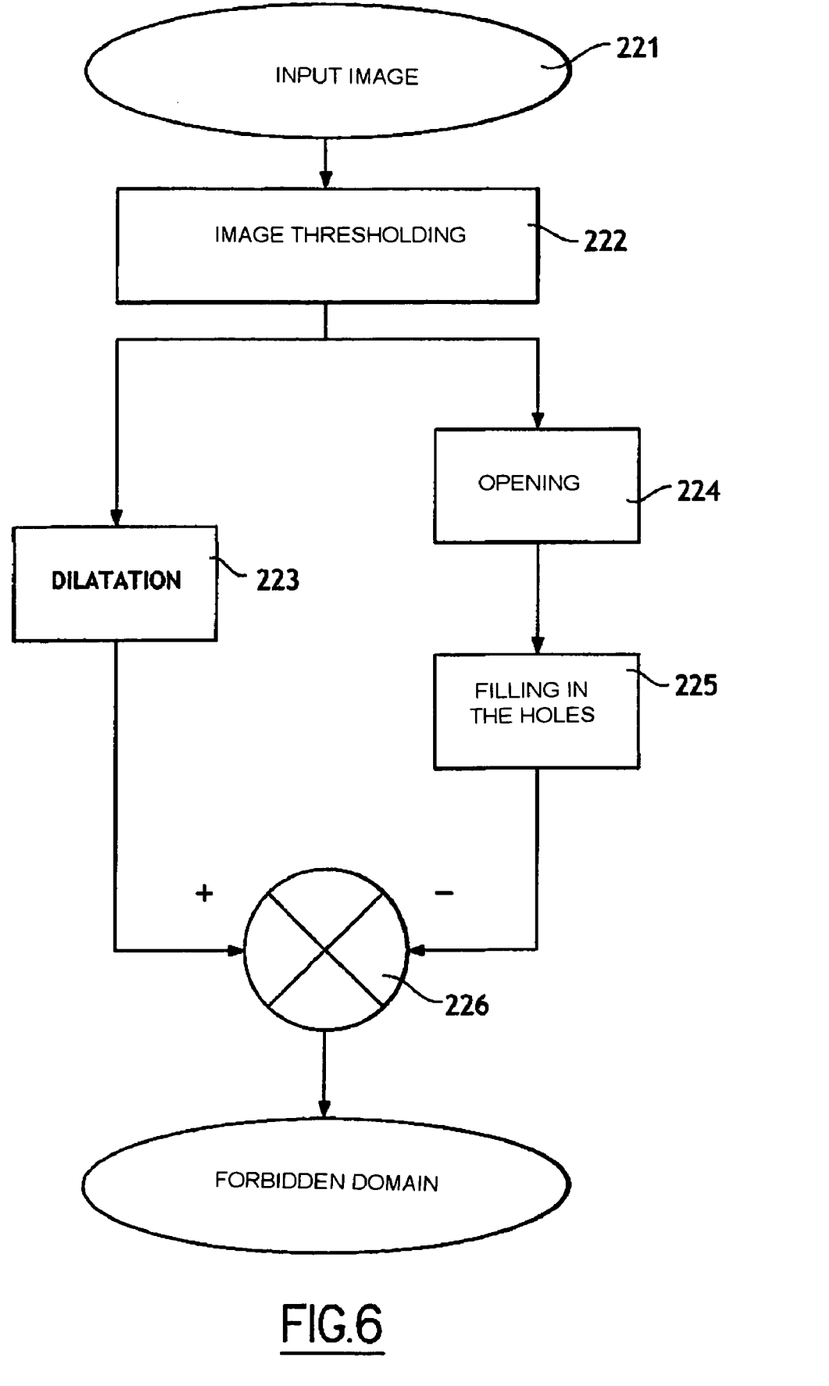
FIG. 6 is a flowchart of a first method of defining the forbidden domain.

With reference to FIG. 6, a first method for defining a forbidden domain is illustrated. This method for definition of the forbidden domain is used in the region extraction method described in FIG. 5 when the first region growth method A is selected in step 210.

Step 221 of the first method for defining the forbidden domain comprises receiving the image. The image comprises objects corresponding to different structures (for example, a medical image of lung, muscle, blood, vertebra corresponding to airway, soft tissue, blood vessel and bone type structures).

Step 222 of the first method for defining the forbidden domain comprises thresholding the input image. This thresholding depends on the value of the marker point as described above: if the value of the marker point is less than −800 Hounsfield units, then only points with a value of less than −800 Hounsfield units are accepted in the image obtained at the output of step 222; if the value of the marker point is between −800 and 120 Hounsfield units, then only points with a value between −800 and 120 Hounsfield units are accepted in the image obtained at the output of step 222; and if the value of the marker point is between 120 and 800 Hounsfield units, then this point forms part of a blood vessel or a bone. The second region growth method B is selected, and only points with a value of more than −15 Hounsfield units are accepted in the image obtained at the output of step 222: if the value of the marker point is more than 800 Hounsfield units, then only points with a value of more than 120 Hounsfield units are accepted in the image obtained at the output of step 222.

The thresholded image is then used to perform two processing operations in parallel. The first processing operation comprises dilating the thresholded image in order to obtain an image including dilated objects (step 223). The second processing operation comprises doing an opening of the thresholded image (step 224), and then doing a closing of the opened image (step 225) in order to fill in the holes in the image objects.

Step 226 of the first method for defining the forbidden domain comprises subtracting the image obtained at the output from the closing step (step 225) from the image obtained at the output from the dilatation step (step 223). The image obtained at the output from step 226 corresponds to the forbidden domain. This forbidden domain is used during application of the region growth method.

Figure 7:
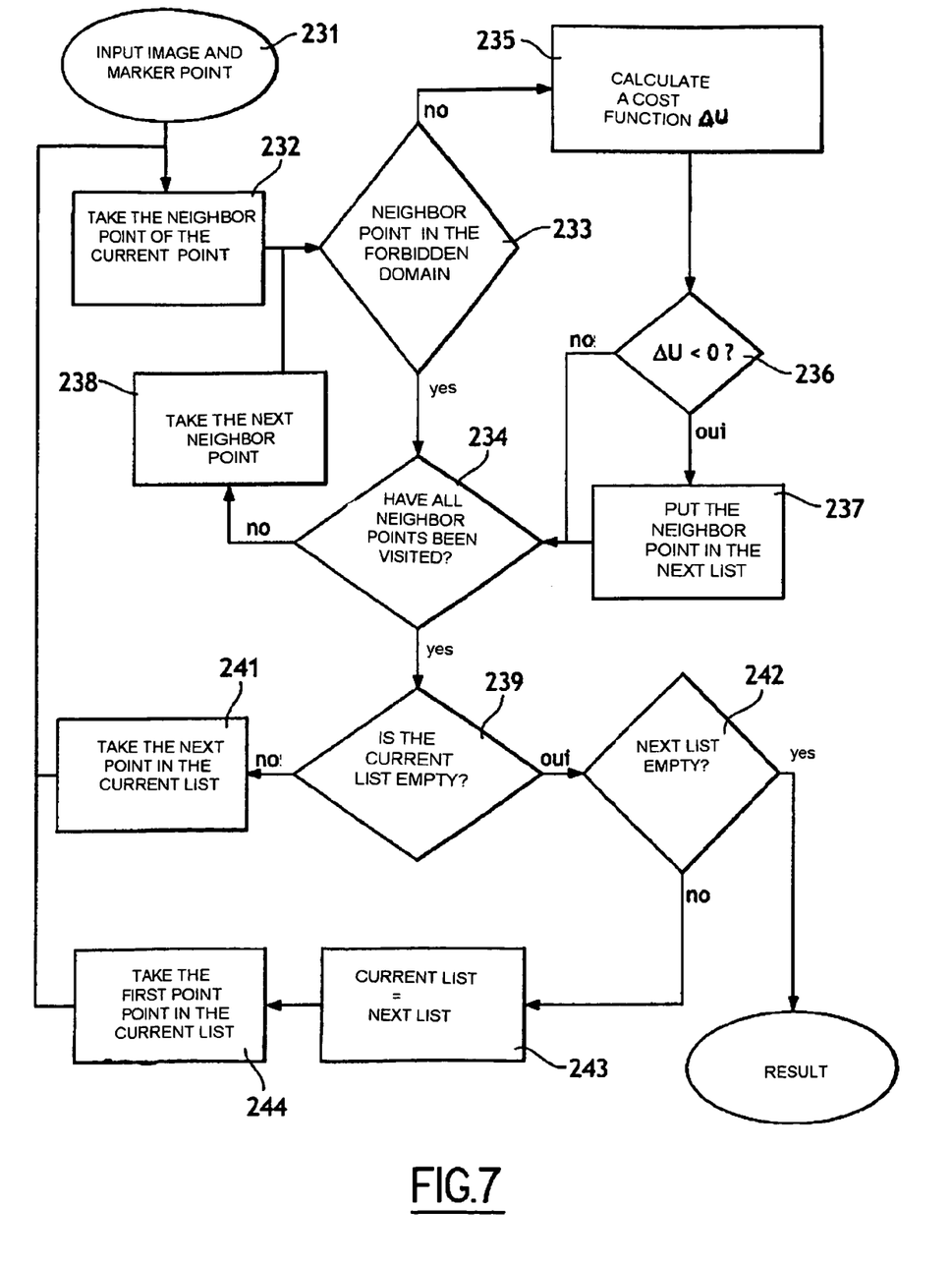
FIG. 7 shows a flowchart of a first region growth method A.

FIG. 7 illustrates the first region growth method A. Step 231 of the first region growth method A comprises receiving an image and the marker point. The marker point is considered as being the current point (point that is being processed) during the first passage in the first region growth method A. Step 232 of the first region growth method A comprises selecting a point close to the current point, in other words a point adjacent to the current point (to the left, right, above or below, in front of or behind the current point). Step 233 of the first region growth method A comprises carrying out a test on the position of the selected neighboring point. If the selected neighbor point is included in the forbidden domain (determined in step 220), then step 234 is carried out that comprises checking that all points that are neighbors to the current point have been selected. Otherwise, step 235 is carried out which comprises calculating a cost function ΔU (including a data attraction term and a regularization term) for this selected neighboring point, followed by step 236 comprising taking the sign of the value ΔU calculated in step 235. In step 236, if the value ΔU is more than 0, then step 234 is carried out. Otherwise, step 237 is carried out that comprises marking the selected adjacent point as forming part of the region and putting it into a pushup list called the "Next" list. Then step 234 is carried out that comprises checking that all points neighboring the current point have been selected. If not all points neighboring the current point have been processed in step 234, then step 238 is carried out that comprises taking one of the unselected neighboring points to the current point, and returning to step 233. If all neighboring points to the current point have been selected, then step 239 is carried out that comprises checking if a pushup list called the "Current" list is empty. In step 239, if the Current list contains points, then the next point in the Current list is selected (step 241), and then the sequence returns to step 232 in the method. Otherwise, test step 242 is carried out to check if the Next list is empty. In step 242, if the Next list contains points, then step 243 is carried out that comprises placing points from the Next list into the Current list, and step 244 is then carried out comprising taking the first point in the Current list. If the Next list is empty, then the first region growth method A is terminated. Points that have been marked as forming part of the region in step 237 form the grown region.

Figure 8:
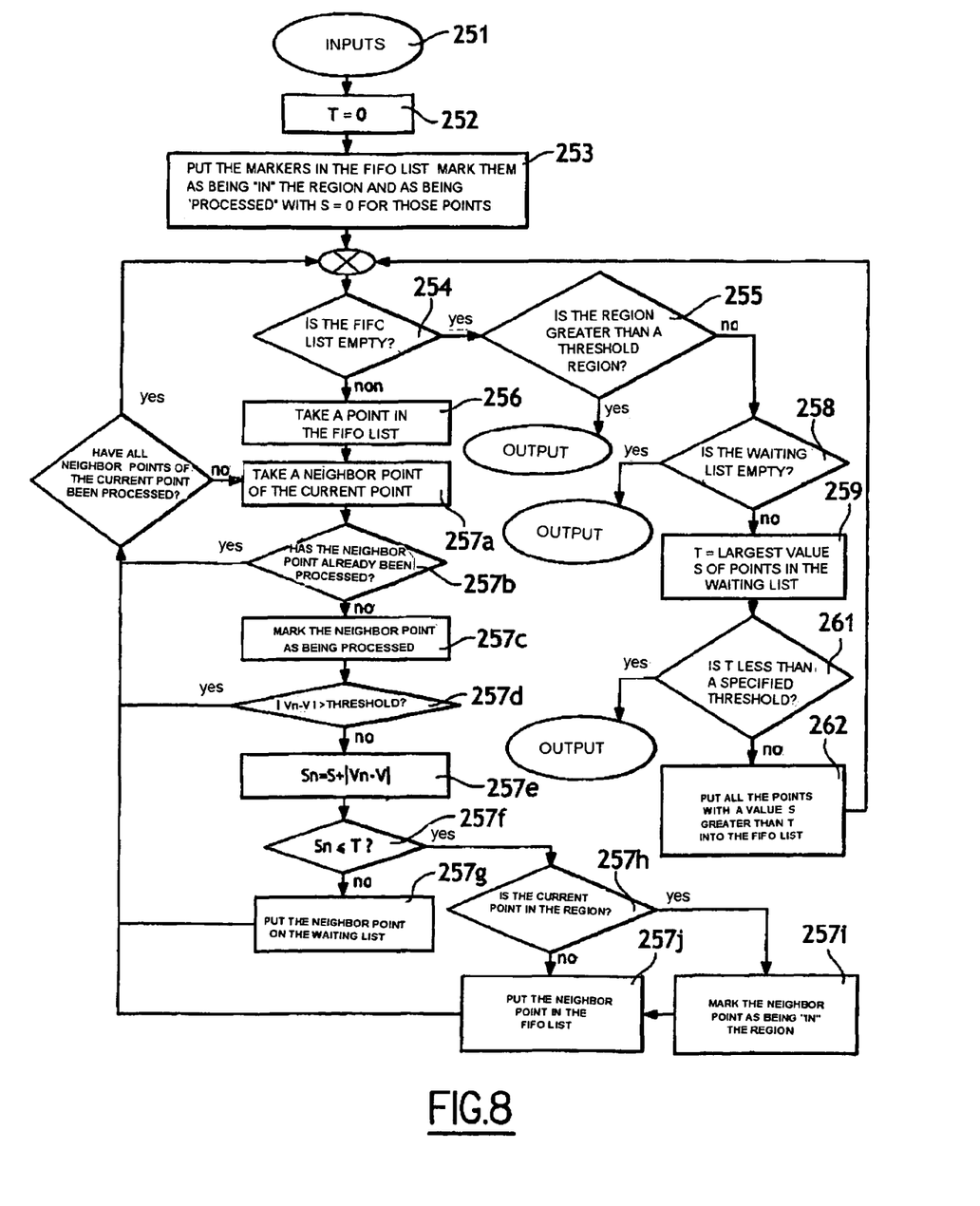
FIG. 8 shows a flowchart of a second region growth method B.

FIG. 8 illustrates the second region growth method B. When this method is used to extract a region of interest, no method for defining the forbidden domain is used. Thus, in the region extraction method illustrated in FIG. 5, step 230 is carried out immediately after step 210. Step 251 of the second region growth method B comprises receiving the image and the marker point(s) selected by the user. Step 252 of the second region growth method B comprises initializing a threshold value T to zero. Step 253 of the second region growth method B comprises putting the marker point in a pushup list called the FIFO ("first in first out) list, identifying it as forming part of the region, and as having been processed. Furthermore, during this step, a difference variable S is initialized to be equal to zero for this marker point. This difference variable S contains the value of the difference between the value of points in the image and the value of the marker point. Step 254 of the second region growth method B comprises checking if the FIFO list is empty. If the FIFO list is empty, then the test step 255 is carried out that comprises checking that the region does not exceed a threshold volume. Otherwise, step 256 is carried out that comprises taking the first point in the FIFO list and considering it as being the current point, and then step 257 that comprises processing six points neighboring the current point. The threshold volume dimensions correspond to the maximum between a fraction of the dimensions of the medical image and a value based on the user's choice of the required segmentation type (fine or coarse), this choice being made by selecting the virtual button 101 or the virtual button 102. The processing in step 257 of the second region growth method B is as follows. In step 257*a*, a neighbor of the current point is selected, and step 257*b* is then carried out that comprises checking that this neighbor point has not already been processed. In step 257*b*, if the neighbor point has already been processed then step 257*a* is carried out again. Otherwise, step 257*c* is carried out that comprises listing the point as being processed. Step 257*d* is then carried out that comprises carrying out a test on the absolute value of the difference "Vn–V" between the value of the neighbor point Vn and the value of the current point V. If the absolute value of the difference "Vn–V" in step 257*d* is greater than a threshold (determined statically in the program used by the processing means), then the next step is step 257*a* and the next neighbor point is selected. Otherwise, step 257*e* is carried out that comprises assigning the sum of the variable S of the current point and the absolute value of the difference "Vn–V", to the difference variable Sn of the neighbor point. Step is 257*f* comprises testing the difference variable Sn for the neighbor point. In step 257*f*, if the difference variable Sn of the neighbor point is greater than the threshold value T, the neighbor point is placed in a pushup list called the waiting list (step 257*g*) and step 257*a* is repeated. Otherwise, step 257*h* is carried out that comprises checking that the current point belongs to the region that is being grown. In step 257*h*, if the current point belongs to the region currently being extracted, step 257*i* comprises listing the neighbor point as being in the region being extracted, and step 257*j* is then carried out that comprises putting the neighbor point into the FIFO list and then returning to step 257*a*. Otherwise, step 257*j* is done directly, and then step 257*a* is repeated. When the six neighbor points of the current point have been processed, the program returns to step 254. In step 255, if the grown region is larger than the threshold volume, then the program exits from the region growth method B. Otherwise, the program goes on to step 258 that comprises checking if the waiting list contains points. If the waiting list is empty in step 258, the program exits from the second region growth method B. Otherwise, step 259 is carried out comprising assigning the value of the difference variable S of points in the waiting list to the threshold value T, and the program then goes on to step 261 that comprises testing the value of T. In step 261, if the threshold value T is less than a value specified by the user that depends on the segmentation type selected by the user using the user interface, the program exits from the second region growth method B. Otherwise, step 262 is carried out comprising putting all points in the waiting list for which the difference variable S is greater than or equal to the threshold value T, into the FIFO list, and step 254 is then repeated. At the exit from the second region growth method, all points that were marked as forming part of the region of interest makes up the region of interest.

Figure 9:
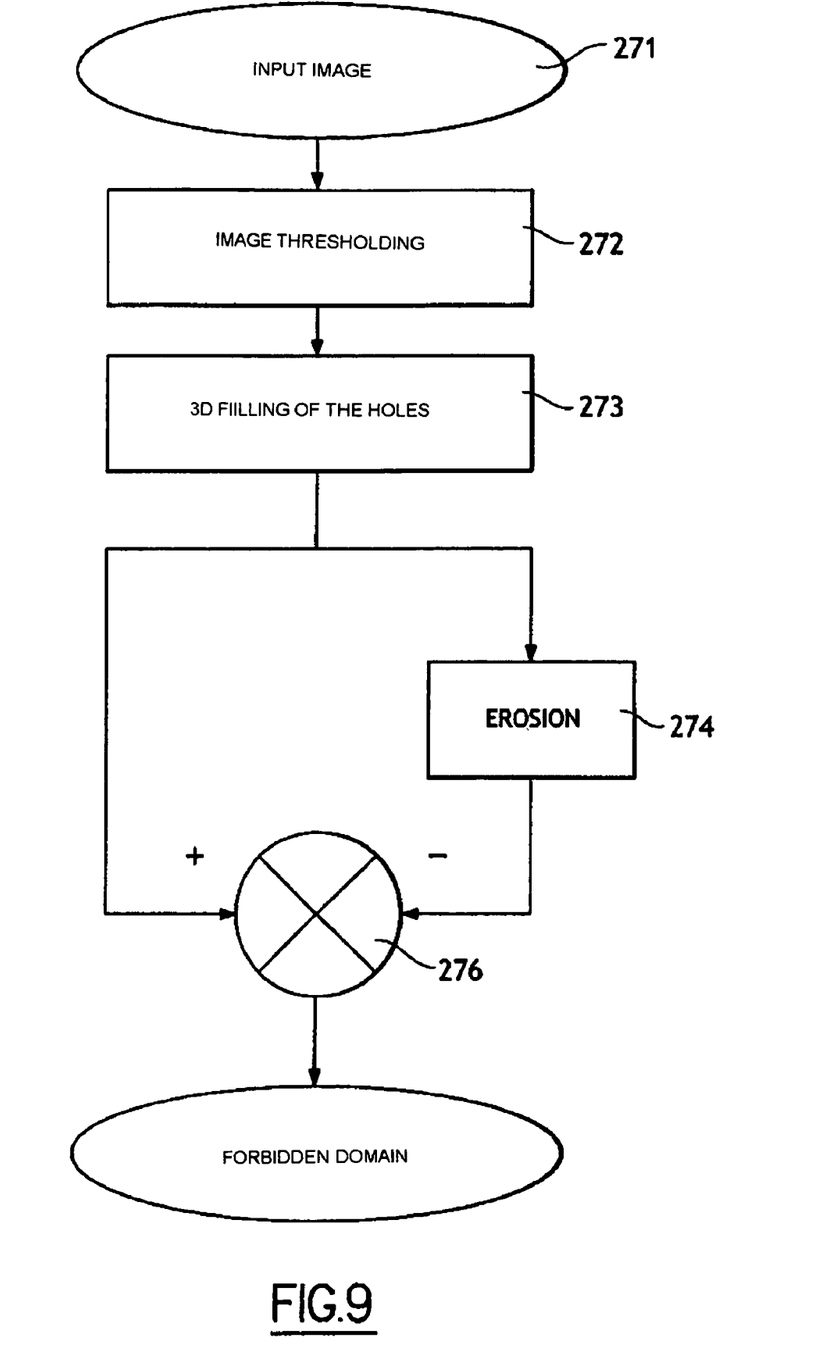
FIG. 9 is a flowchart of a second method of defining a forbidden domain.

FIG. 9 illustrates a second method for defining a forbidden domain. The second method for defining the forbidden domain is used in the segmentation method described in FIG. 5 when the third region growth method C is selected in step 210. Step 271 of the second method for defining the forbidden domain comprises receiving the image. Step 272 of the second method for defining the forbidden domain comprises thresholding the input image. Step 273 of the second method for defining the forbidden domain comprises filling in the thresholded image holes, for example using a closure (using a 3D structuring element in order to fill in holes over the entire thickness of the slice of the object represented in the image). The filled image is then eroded (step 274) and the eroded image obtained in step 274 is then subtracted from the filled image in step 273 (step 276). The image obtained at the output from the subtraction step corresponds to the forbidden domain. This forbidden domain is used during application of the Bone region growth method.

Figure 10:
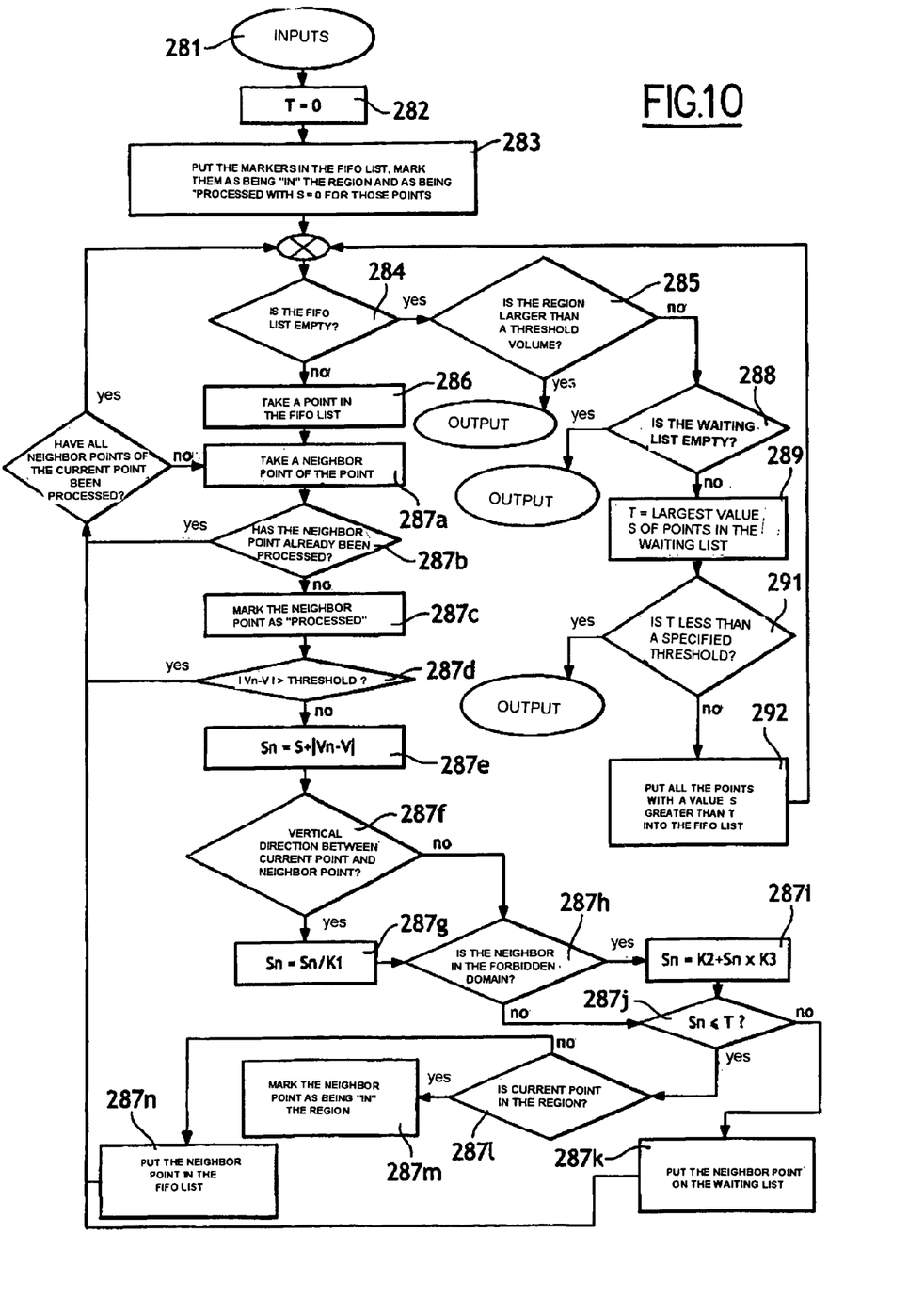
FIG. 10 shows a flowchart of a third region growth method C.

FIG. 10 illustrates the third region growth method C. Step 281 of the third region growth method C comprises receiving the image and the marker point(s) selected by the user. Step 282 of the third region growth method C comprises initializing a threshold T value to zero. Step 283 of the third region growth method C comprises placing the marker point in a pushup list called the FIFO (first input first output) list, listing it as forming part of the region, and as having been processed. Furthermore, during this step, a difference variable S is initialized to zero for this marker point. This difference variable S is used to store the value of the difference between the value of image points and the value of the marker point. Step 284 of the third region growth method C comprises checking if the FIFO list is empty. If the FIFO list is empty, the program goes on to step 285 comprising checking that the region does not exceed a threshold volume. Otherwise, the next step 286 comprises taking the first point in the FIFO list and considering it as the current point, and step 287 then comprises processing the six neighbor points of the current point. The dimensions of the threshold volume correspond to the maximum between a fraction of the dimensions of the medical image and a value based on the user's choice of the required type of segmentation (fine or coarse), this choice being made through the user interface and the virtual button 101 or the virtual button 102. The processing for step 287 of the third region growth method C is as follows. In step 287a, a neighbor point to the current point is selected and step 287b is then carried out that comprises checking that the neighbor point has not already been processed. In another step 287b, if the neighbor point has already been processed, the program goes back to step 287a. Otherwise, another step 287c is carried out that comprises listing the point as having been processed. Step 287d comprises making a test on the absolute value of the difference "Vn–V" between the value of the neighbor point Vn and the value of the current point V. In step 287d, if the absolute value of the difference "Vn–V" is more than a threshold, then the program goes back to step 287a and the next neighbor point is selected. Otherwise, another step 287e is carried out that comprises assigning the sum of the variable S of the current point and the absolute value of the difference "Vn–V", to the difference variable Sn of the neighbor point. Another step 287f is carried out that comprises testing the position of the neighbor point. In step 287f, if the direction between the current point and the neighbor point is vertical, in other words if the neighbor point belongs to a reconstructed image located above or below the reconstructed image containing the current point, then another step 287g is carried out that comprises assigning its own value divided by a coefficient K1 to the difference variable Sn, and then goes on to the step that comprises checking that the neighbor point is not in the forbidden domain. Otherwise, another step 287h is carried out directly after step 287f. Step 287h comprises testing if the location of the neighbor point in the image. In step 287h, if the neighbor point is in the forbidden domain, then another step 287i is carried out that consists of setting the difference variable Sn equal to the sum of a coefficient K2 to the product of the value of the variable Sn and a coefficient K3, and then another step 287j is carried out that comprises testing the value of the variable Sn. In step 287j, if the value of the difference variable Sn of the neighbor point is greater than the threshold T value, the neighbor point is placed in a pushup list called the waiting list (step 287k), and the program then returns to step 287a. Otherwise, another step 287l is carried out that comprises checking that the current point belongs to the region that is to be grown. In step 287l, if the current point belongs to the region being extracted, another step 287m is carried out that comprises listing the neighbor point as being in the region currently being extracted, then another step 287n is carried out that comprises putting the neighbor point in the FIFO list, and the program then returns to step 287a. Otherwise, step 287n is carried out directly and then step 287a is carried out.

When the six neighbor points of the current point have been processed, the program returns to step 284. In step 285, if the grown region is larger than a threshold volume, the third region growth method C is terminated. Otherwise, another step 288 is carried out that comprises checking if the waiting list contains any points. If the waiting list is empty in step 288, then the third region growth method is terminated. Otherwise, another step 289 is carried out that comprises assigning the value of the difference variable S of points in the waiting list to the threshold value T, and another step 291 is then carried out that comprises testing the value of T. In step 291, if the threshold value T is less than a value specified by the user that depends on the segmentation type selected by the user using the user interface, the third region growth method C is terminated. Otherwise, another step 292 is carried out that comprises putting all points in the waiting list for which the difference variable S is greater than or equal to the threshold value T into the FIFO list, and step 284 is then executed. At the end of the third region growth method C, all points that were noted as forming part of the region of interest make up the region of interest.

Therefore, the system for displaying regions of interest described herein is an easy to use tool due to the design of its user interface which is very intuitive and results can be displayed as the processing is being done. Another advantage of this system is the adaptability of the region extraction method used in the means for processing. The behavior of the means for processing is adjusted, particularly by choosing one of the several possible region growth methods depending on the virtual buttons selected by the user.

The system for displaying regions of interest is associated with a method for displaying regions of interest comprising the steps of displaying the interface (the display of the virtual buttons and the window), of starting the region extraction method in response to a region extraction command, or of starting other operations as a function of the virtual buttons selected by the user (processing cancellation buttons, etc.). This method for displaying regions of interest (using the region extraction methods by region growth starting from a marker point) is implemented in the form of a computer program using coding means (C, C++ or other programming language). This is the computer program that the means for processing (for example a computer) may execute to implement the method for displaying regions of interest.

The user interface described in FIG. 4 comprises virtual buttons that control extraction of a region without having specified the structure (automatic selection of the region growth method by the region extraction method) and virtual buttons controlling extraction of a bone structure region of interest (selection of the third region growth method C). The reader will understand that the user interface may also comprise other virtual buttons such as ADD VESSEL and/or DELETE VESSEL and/or ADD SOFT TISSUE and/or DELETE SOFT TISSUE buttons controlling extraction of the region of interest in special structures requiring the use of a special region growth method.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

What is claimed is:

1. A system for processing an image, comprising:
   a computer;
   an input device operably communicating with the computer;
   a display device operably communicating with the computer;
   a graphic user interface displayable on the display device, the graphic user interface having virtual buttons displayed on the display device that are selectable by a user using the input device, the virtual buttons enabling the user to control the computer for extracting a region of interest of the image, by growth of the region of interest starting from at least one marker point belonging to the region of interest, and if a value of the at least one marker point is less than a predetermined number of Hounsfield units, then only including points of the image in the region of interest that have values less than the predetermined number of Hounsfield units, and a first virtual button of the virtual buttons displayed on the display device enabling the user to stop growth of the region of interest upon selection of the first virtual button by the input device such that the extracting of the region of interest is completed, and a second virtual button of the virtual buttons displayed on the display device enabling the user to select a first region growth method among a plurality of region growth methods if the second virtual button is selected utilizing the input device, and a third virtual button of the virtual buttons displayed on the display device enabling the user to select a second region growth method if the third virtual button is selected utilizing the input device; and
   a window in which the region of interest is displayed.

2. The system according to claim 1, wherein the window displays the image in a form of a three-dimensional volume representing an acquired part of an object body, and/or in a form of reconstructed images each representing a slice of an acquired part of the object body.

3. The system according to claim 1, wherein the window displays the image in a form of a three-dimensional volume of the extracted region of interest and/or in a form of destination images each representing a slice of the extracted region of interest as the region of interest grows.

4. The system according to claim 1, wherein the graphic user interface further includes a fourth virtual button enabling the user to control the computer for canceling one or several processing operations performed on the image.

5. The system according to claim 1 wherein at least one marker point in the region of interest is selected by the user by positioning a graphic cursor on a point in the image displayed in the window and selecting the point utilizing the input device.

6. The system according to claim 1, wherein at least a portion of the virtual buttons are configured to add or delete regions of interest of different structures, the selection of one of the virtual buttons by the user controlling the computer for implementing a region extraction, wherein the computer receives the image and parameters input by the user using the graphic user interface, selects as a function of the parameters input by the user, one region growth method from among the plurality of region growth methods, extracts the region of interest by using the selected region growth method, and displays addition or deletion of the region of interest in the window, as the region of interest grows.

7. The system according to claim 6, wherein the parameters input by the user comprise the marker point, and an extraction command to add or delete the region of interest.

8. The system according to claim 1, wherein the graphic user interface includes at least fourth and fifth virtual buttons allowing a choice of a level of homogeneity of regions extracted by the computer; the fourth virtual button allowing the control of the computer for extracting homogeneous regions; and the fifth virtual button controlling the computer for extracting less homogeneous regions.

9. The system according to claim 1 wherein the virtual buttons enable the user to control the computer for extracting the region of interest by growth of the region of interest starting from a plurality of points included in a neighborhood of the marker point.

10. The system of claim 1, wherein the second virtual button is displayed only at a fixed position on the display device.

11. A method for processing an image comprising:
   displaying virtual buttons on a display device;
   when a first virtual button of the virtual buttons displayed on the display device is selected by a user utilizing an input device, extracting a region of interest of the image using a region extraction method by growth of the region of interest utilizing a computer, the growth of the region of interest starting from at least one marker point belonging to the region of interest, and if a value of the at least one marker point is less than a predetermined number of Hounsfield units, then only including points of the image in the region of interest that have values less than the predetermined number of Hounsfield units;
   displaying the region of interest on the display device as the region grows;
   when a second virtual button of the virtual buttons displayed on the display device is selected by the user utilizing the input device, stopping growth of the region of interest such that the extracting of the region of interest is completed;

choosing a first region growth method among a plurality of region growth methods based on parameters input by the user utilizing the input device; and choosing a second region growth method among the plurality of region growth methods based on other parameters input by the user utilizing the input device;

receiving the image and parameters input by the user using a graphic user interface displayed on the display device;

extracting the region of interest based on the selected region growth method utilizing the computer; and displaying an addition or a deletion of the region of interest on the display device, as the region of interest grows;

receiving the image representing part of an object body;

defining an image portion representing a forbidden domain for points in the region of interest to be extracted;

putting at least one point of the region of interest to be extracted into a pushup list of the First In First Out (FIFO) type;

determining whether the FIFO list contains points;

selecting a point in the FIFO list as a current point;

selecting a neighbor point of the current point;

determining whether the selected neighbor point has already been processed;

marking the neighbor point as having been processed;

performing a test on an absolute value of a difference value between a value of the neighbor point and a value of the current point;

assigning a sum of a difference variable S of the current point and an absolute value of the difference value to a difference variable Sn of the neighbor point;

performing a test on a direction between the current point and the neighbor point;

assigning a ratio of a value of the difference variable Sn divided by a first coefficient K1 to the difference variable Sn;

checking if the neighbor point is in the forbidden domain;

assigning a result of a sum of a second coefficient K2 and a product of a third coefficient K3 and the value of the difference variable Sn of the neighbor point, to the difference variable Sn;

testing a value of the difference variable Sn;

determining if the current point belongs to the region of interest;

marking the neighbor point as being in the region of interest;

putting the neighbor point in the FIFO list;

performing a test on dimensions of the region of interest being extracted;

determining whether a waiting list does not contain any points;

assigning a largest value of the difference variable S for points in the waiting list to a dynamic threshold variable;

performing a test on the value of the dynamic threshold variable; and placing points in the waiting list for which the value of the difference variable S is less than a value of the dynamic threshold variable, in the FIFO list.

12. The method according to claim 11, wherein displaying the region of interest comprises displaying the region of interest in a form of a three-dimensional volume representing an acquired part of an object body, and/or in a form of reconstructed images each representing a slice of an acquired part of the object body.

13. The method according to claim 11 further comprising: displaying a third virtual button allowing cancellation of one or several processing operations being performed on the image.

14. The method according to claim 11 wherein the predetermined number of Hounsfield units is −800 Hounsfield units; and if the value of the marker point is less than −800 Hounsfield units, choosing the first region growth method and defining a thresholding parameter such that only points with a value of less than −800 Hounsfield units are included in the region of interest to be extracted;

if the value of the marker point is between −800 and 120 Hounsfield units, choosing the first region growth method and defining a thresholding parameter such that only points with a value between −800 and 120 Hounsfield units are included in the region of interest to be extracted;

if the value of the marker point is between 120 and 800 Hounsfield units, choosing the second region growth method and defining a thresholding parameter such that only points with a value of more than −15 Hounsfield units are included in the region of interest to be extracted; and if the value of the marker point is more than 800 Hounsfield units, choosing the first region growth method and defining a thresholding parameter such that only points with a value of more than 800 Hounsfield units are included in the region of interest to be extracted.

15. The method according to claim 11 wherein defining the image portion representing a forbidden domain comprises:

thresholding the image so as only to keep the points respecting a threshold criterion;

closing the thresholded image in order to obtain an image comprising objects in which holes have been filled;

eroding the thresholded image, so as to obtain an image containing eroded objects; and subtracting the image obtained from the erosion step from the image obtained at the closing step in order to obtain the image portion representing the forbidden domain.

16. The method according to claim 11 comprising extracting the region of interest using the region extraction method by growth of the region of interest starting from a plurality of points in the neighborhood of the marker point.

17. The method of claim 11, further comprising displaying the second virtual button only at a fixed position on the display device.

18. A system for processing an image, comprising:

a computer;

an input device operably communicating with the computer;

a display device operably communicating with the computer;

a graphic user interface displayable on the display device, the graphic user interface having:

virtual buttons displayed on the display device that are selectable by a user using the input device, the virtual buttons enabling the user to control the computer for extracting a region of interest of the image, by growth of the region of interest starting from at least one marker point belonging to the region of interest, and if a value of the at least one marker point is less than a first predetermined number of Hounsfield units, then only including points of the image in the region of interest that have values less than the first predetermined number of Hounsfield units, and if the value of the at least one marker point is in a range from the first predetermined number of Hounsfield units to a second predetermined number of Hounsfield units, then only including points of the image in the region of interest that have values in the range from the first predetermined number of Hounsfield units to the second predetermined number of Hounsfield units, and a first virtual button of the virtual buttons displayed on the display device enabling the user to stop growth of the region of interest upon actuation of the first virtual button by the input device such that the extracting of the region of interest is completed, and a second virtual button of the virtual buttons displayed on the display device enabling the user to select a first region growth method among a plurality of region growth methods if the second virtual button is selected utilizing the input device, and a third virtual button of the virtual buttons displayed on the display device enabling the user to select a second region growth method if the third virtual button is selected utilizing the input device; and a window in which the region of interest is displayed on the display device.

19. The system of claim 18, wherein the second virtual button is displayed only at a fixed position on the display device.

20. A method for processing an image comprising:

displaying virtual buttons on a display device;

when a first virtual button of the virtual buttons is selected by a user utilizing an input device, extracting a region of interest of the image using a region extraction method by growth of the region of interest utilizing a computer, the growth of the region of interest starting from at least one marker point belonging to the region of interest, and if a value of the at least one marker point is less than a predetermined number of Hounsfield units, then only including points of the image in the region of interest that have values less than the predetermined number of Hounsfield units;

displaying the region of interest on the display device as the region grows;

when a second virtual button of the virtual buttons is selected by the user utilizing the input device, stopping growth of the region of interest such that the extracting of the region of interest is completed;

receiving the image representing part of an object body and parameters input by the user using a graphic user interface displayed on the display device;

as a function of the parameters input by the user, choosing one region growth method from among a plurality of region growth methods utilizing the computer;

extracting the region of interest based on the selected region growth method utilizing the computer; and displaying an addition or a deletion of the region of interest on the display device, as the region of interest grows;

putting at least one point of the region of interest to be extracted into a pushup list called the FIFO (first in first out) list;

determining whether the FIFO list contains points;

selecting a point in the FIFO list as a current point;

selecting a neighbor point of the current point;

determining whether the selected neighbor point has not already been processed;

marking the neighbor point as having been processed;

performing a test on the absolute value of a difference value between a value of the neighbor point and a value of the current point;

assigning a sum of a difference variable S of the current point and an absolute value of the difference value, to a difference variable Sn of the neighbor point;

performing a test on the value of the difference variable Sn;

performing a test on a position of the current point;

marking the neighbor point as being in the region of interest, putting the neighbor point in the FIFO list and selecting a neighbor point of the current point;

performing a test on dimensions of the region of interest being extracted;

determining whether a waiting list does not contain any points;

assigning a largest value of the difference variable S for points in the waiting list to a dynamic threshold variable;

testing a value of the dynamic threshold variable; and placing points in the waiting list for which the value of the difference variable S is less than a value of the dynamic threshold variable, in the FIFO list.

* * * * *